US012531911B2

(12) United States Patent
Lahav et al.

(10) Patent No.: US 12,531,911 B2
(45) Date of Patent: Jan. 20, 2026

(54) SECURITY GRAPH LAYERING ENGINE IN A SECURITY MANAGEMENT SYSTEM

(71) Applicant: Microsoft Technology Licensing, LLC, Redmond, WA (US)

(72) Inventors: Chen Lahav, Givatayim (IL); Idan Yehoshua Hen, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 18/314,393

(22) Filed: May 9, 2023

(65) Prior Publication Data

US 2024/0380785 A1 Nov. 14, 2024

(51) Int. Cl.
G06F 21/62 (2013.01)
G06F 21/57 (2013.01)
H04L 9/40 (2022.01)

(52) U.S. Cl.
CPC .......... H04L 63/20 (2013.01); H04L 63/1416 (2013.01)

(58) Field of Classification Search
CPC . H04L 63/20; H04L 63/1416; H04L 63/1433; H04L 63/1441
USPC ......................................... 726/1–2, 1–4, 25
See application file for complete search history.

(56) References Cited

U.S. PATENT DOCUMENTS

| | | | | |
|---|---|---|---|---|
| 7,472,422 B1 * | 12/2008 | Agbabian | ............... | H04L 63/20 726/25 |
| 11,706,252 B1 * | 7/2023 | Gabay | ................. | H04L 63/1416 726/22 |
| 11,716,346 B1 * | 8/2023 | Kraemer | ............. | H04L 63/1433 |
| 11,930,046 B2 * | 3/2024 | Albanese | ............. | H04L 63/1433 |
| 2022/0407891 A1 | 12/2022 | Albanese | | |
| 2023/0093332 A1 * | 3/2023 | Ithal | .................... | H04L 63/1416 726/25 |
| 2023/0123477 A1 | 4/2023 | Luttwak | | |
| 2024/0205259 A1 * | 6/2024 | Tembey | ............. | H04L 63/1433 |

OTHER PUBLICATIONS

International Search Report and Written Opinion received for PCT Application No. PCT/US2024/025896, Jun. 21, 2024, 15 pages.

* cited by examiner

Primary Examiner — Bharat Barot
(74) Attorney, Agent, or Firm — Shook, Hardy & Bacon L.L.P.

(57) ABSTRACT

Methods, systems, and computer storage media for providing security incident management using a security graph layering engine in a security management system. Security incident management is provided using the security graph layering engine that include multi-layer security graph that supports querying a security graph using a multi-layer representation of data associated with security graph. In operation, a security graph associated with a plurality of security resources in a cloud environment is accessed. Based on accessing the security graph, a multi-layer security graph is generated. The multi-layer security graph is a multi-layer representation of the security. The multi-layer security graph is deployed. A security query associated with the multi-layer security graph is accessed. The security query is executed based on the multi-layer security graph, executing the security query generates a query result. The query result is communicated to a security incident management client to cause display of the security query results.

20 Claims, 14 Drawing Sheets

SECURITY GRAPH LAYERING ENGINE IN A SECURITY MANAGEMENT SYSTEM

BACKGROUND

Users rely on computing environments with applications and services to accomplish computing tasks. Distributed computing systems host and support different types of applications and services in managed computing environments. In particular, computing environments can implement a security management system that provides security incident management functionality and supports threat protection in the computing environments. For example, cloud security incident management (CSPM) can include identifying and remediating risk by automating visibility, executing uninterrupted monitoring and threat detection, and providing remediation workflows to search for misconfigurations across diverse cloud computing environments and infrastructure.

SUMMARY

Various aspects of the technology described herein are generally directed to systems, methods, and computer storage media for, among other things, providing security incident management using a security graph layering engine of a security management system. Security incident management supports security management of a computing environment based on a multi-layer security graph that operates as a proxy representation of a security graph. The security graph operates as a centralized security service that provides a unified Application Programming Interface (API) to access security-related information, and the multi-layer security graph supports querying the security graph using the multi-layer representation (i.e., configuration layer, a presentation layer, and a query layer) of data associated with security graph.

The multi-layer security graph refers to a representation of a security graph that supports providing security query responses for security queries in a computing environment. The multi-layer security graph is programmatically constructed and derived, at least in part, based on the security graph. The multi-layer security graph is generated based on selectively integrating security graph data into the configuration layer, the presentation layer, and the query layer of the multi-layer security graph. The security graph layering engine operates to provide a security graph layering model that processes security graph data-using security graph layering operations—to generate the multi-layer security graph.

A security incident management engine can access the multi-layer security graph to process security queries and generate query results. For example, a security administrator can investigate an ongoing threat in a computing environment based on a security query for security incident management information, the security incident management information is provided using a configuration layer, a presentation layer, and query layer. The security incident management information in the multi-layer security graph is generated based on security graph layering operations that optimize querying the security graph for query results comprising security incident management information.

Conventionally, security management systems are not configured with a comprehensive computing logic and infrastructure to efficiently provide adequate security query responses. For example, a security graph in a computing environment can store and provide access to security information in a manner that makes querying the security graph—for security query responses-complex and computationally expensive. A security management system with such a security graph lacks integration with security graph layering operations. Moreover, merely determining security incident management information based on a single layer representation of security data-without additional data representation layers—may cause deficient functioning of a security management system because the user interface querying experience is diminished and retrieving security graph data and causing presentation of query results requires significantly more compute resources.

A technical solution—to the limitations of conventional security management systems—can include the challenge of generating a multi-layer security graph based on a security graph; generating query results for security queries using the multi-layer security graph that includes the configuration layer, the presentation layer, and the query layer; and providing security management operations and interfaces-via a security graph layering engine that supports security incident management in a security management system. As such, the security management system can be improved based on security graph layering operations that operate to generate a multi-layer security graph as a specific type of data structure-designed to improve the way a security management system stores and retrieves security data; and the security graph layering operations further operate to generate query results to summarize and provide security incident management information of a computing environment in a particular manner.

In operation, a security query associated with a multi-layer security graph is accessed. The multi-layer security graph is a proxy representation of a security graph associated with a plurality of security resources in a cloud computing environment. The multi-layer graph comprises a plurality of layers comprising selectively integrated security graph data associated with the security graph, the plurality of layers comprising a configuration layer, a presentation layer, and a query layer. The security query is executed based on the multi-layer security graph, where executing the security query comprises generating a query result for the security query. Each of the plurality of layers supports a use case associated with the security query for generating the query result. The query result is communicated to cause generation of the security query on a security incident client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
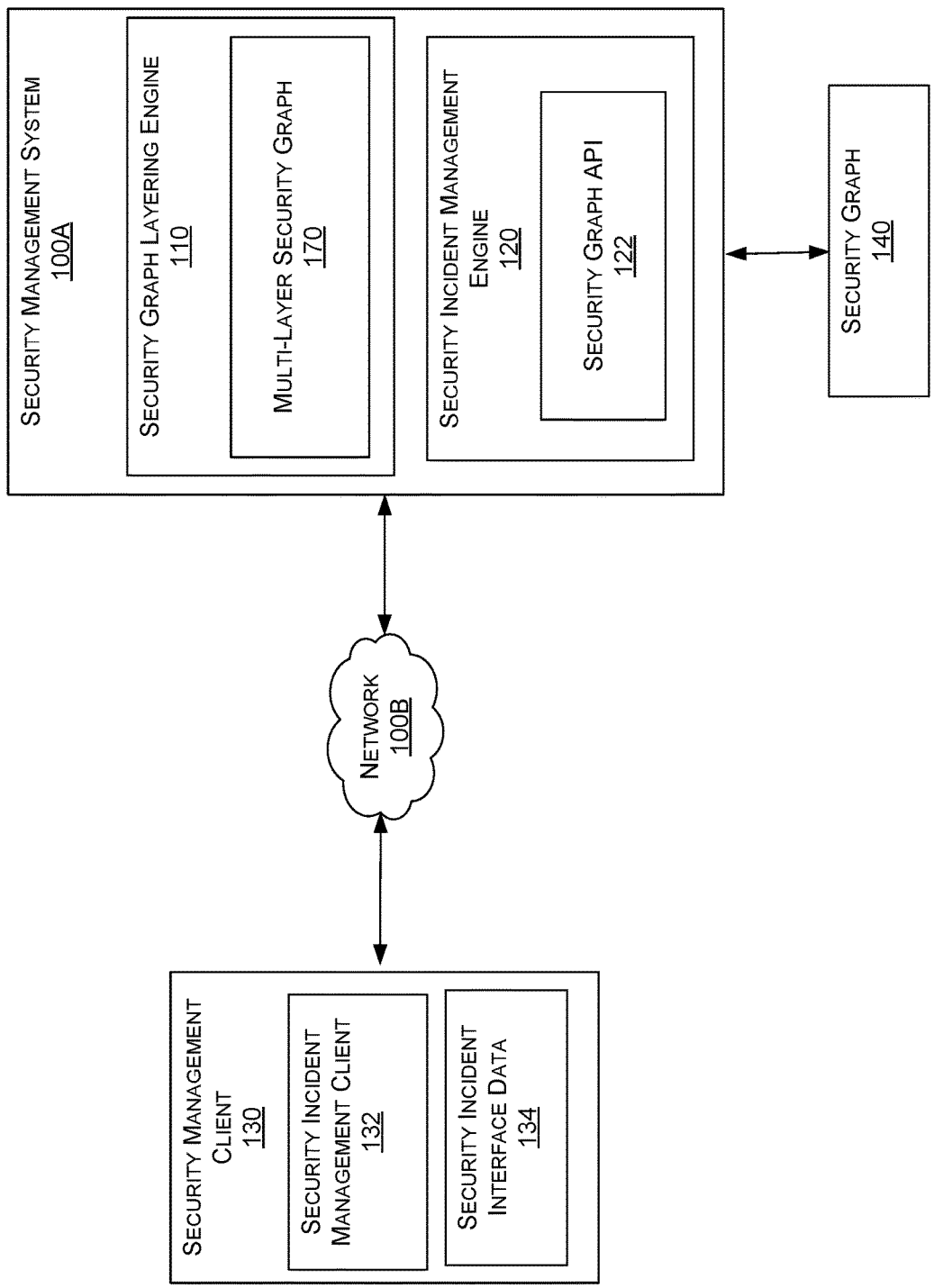
FIGS. 1A and 1B are block diagrams of an exemplary security management system including a security graph layering engine, in accordance with aspects of the technology described herein.

A security management system supports management of security aspects of resources and workloads in computing environments. The security management system can help enable protection against threats, help reduce risk across different types of computing environments, and help strengthen a security posture of computing environments—i.e., security status and remediation action recommendations for computing resources including networks and devices. For example, the security management system can provide real-time security alerts, centralize insights for different resources, and provide for preventative protection, post-breach detection, and automated investigation, and response.

Conventionally, security management systems are not configured with a comprehensive computing logic and infrastructure to efficiently provide adequate security query responses for security information in a computing environment. For example, a security graph in a computing environment can include information and store information in a manner that makes querying the security graph—for security query responses-complex and computationally expensive. A security management system with such a security graph lacks integration with security graph layering operations. Moreover, merely determining security incident management information based on a single layer representation of security data-without additional data representation layers—may cause deficient functioning of a security management system because the user interface querying experience is diminished and retrieving security graph data and causing presentation of query results requires significantly more compute resources.

By way of illustration, a conventional security management system may include a security graph that stores data based on static operational features of the entities. For example, a Network Security Group (NSG) can be connected to a plurality of subnets and Network Interface Controllers (NICs), where a change in the NSG can result in an observable change in the plurality of subnets and NICs based on identifying traffic flowing through the plurality of subnets and NICs. In this way, the NSG in a conventional security management system may define edges that exclusively indicate that the NSG configures or impacts the plurality of subnets or NICs. However, an attack scenario may involve a configuration of the plurality of subnets or NICs that impact the NSG. Such a configuration may not be queried in a security management system that does not provide the alternative configuration data in a layered data representation.

In addition, a conventional security management system may provide security data with details that make it computationally expensive to execute certain queries. For example, it may be challenging to answer a query: "fetch VMs that are exposed to the internet." A plurality of combinations of connections between computing components (e.g., a first instance: (Internet)→(IP Address)→(Load balancer)→(VM); a second instance: (Internet)→(IP Address→(VM); and a third instance: (Internet)→(IP Address)→(Applications Load balancer)→(Elastic Compute instance)) will have to be generated and provided in different queries to determine an answer, which can require significant computing resources.

Moreover, security query responses can further include data that is not particularly relevant to a type of security-oriented question or a security query because a conventional security graph can include non-key entities. Generating security queries that ignore irrelevant data not associated with the security query can include some complexity in generating the security query, which makes for a deficient user interface experience and computationally expensive in execution. As such, a more comprehensive security management system—with an alternative basis for performing secure management operations—can improve computing operations and interfaces in security management systems.

Embodiments of the present technical solution are directed to systems, methods, and computer storage media for, among other things, providing security incident management using a security graph layering engine of a security management system. Security incident management supports security management of a computing environment based on a multi-layer security graph that operates as a proxy representation of a security graph. The security graph operates as a centralized security service that provides a unified Application Programming Interface (API) to access security-related information, and the multi-layer security graph supports querying the security graph using the multi-layer representation (i.e., configuration layer, a presentation layer, and a query layer) of data associated with security graph. Security incident management is provided using the security graph layering engine that is operationally integrated into the security management system. The security management system supports a security graph layering framework of computing components associated with generating the multi-layer security graph based on a security graph and generating query results for security queries using the multi-layer security graph that includes the configuration layer, the presentation layer, and the query layer.

The multi-layer security graph refers to a representation of a security graph that supports providing security query responses for security queries in a computing environment. The multi-layer security graph is programmatically constructed and derived, at least in part, based on the security graph. The multi-layer security graph is generated based on selectively integrating security graph data into the configuration layer, the presentation layer, and the query layer of the multi-layer security graph. The security graph layering engine operates to provide a security graph layering model that processes security graph data-using security graph layering operations—to generate the multi-layer security graph.

A security incident management engine can access the multi-layer security graph to process security queries and generate query results. For example, a security administrator can investigate an ongoing threat in a computing environment based on a security query for security incident management information, the security incident management information is provided using a configuration layer, a presentation layer, and query layer. The security incident management information in the multi-layer security graph is generated based on security graph layering operations that optimize querying the security graph for query results comprising security incident management information.

At a high level, a security management system supports communicating to a cloud computing platform customer any security issues in their cloud computing environment. The security management system is configured to trigger alerts for potential or actual threats-including suspicious behavior or malicious behavior—in a computing environment. For example, an alert configuration can be defined to include alert settings, which if met, trigger an alert. The security alert can refer to a human-readable, technical notification regarding current vulnerabilities, exploits, and other security issues associated with a computing environment. The alert can be communicated to a client device that is managed by a security administrator who can then follow up on the alert.

Different types of potential threats and actual threats exist, for example, use of proxies to gain access to a computing environment or unauthorized running of crypto mining software in a computing environment. An attack on a cloud computing environment—for example, performed by a malicious actor—can include several attack operations that are executed to gain access to resources on the cloud computing environment. The attack operations can trigger alerts, when the security management system is configured to monitor for these types of attack operations. If multiple attack operations are identified—and a determination that the attack operations are related is made—the alerts associated with the attack operations can be defined as a security incident. The security incident can refer to a collection of correlated alerts and corresponding security data that make up a story of an attack. A security incident can combine multiple alerts associated with a single attack to support managing and responding to the security incident.

The attack story can be associated with a security graph and an attack path definition that identifies attack objects (e.g., attack operations, compromised resources, file locations and file types). The attack path definition can describe how an attacker gained access to a computing environment and related operations and computing resources associated with the attack and unauthorized access. An attack path analysis-using a graph-based algorithm-scans a cloud security graph to identify exploitable paths that attackers may use to breach a computing environment. The attack path analysis exposes attack paths and suggests remediation actions for issues that would break the attack path and prevent a successful breach.

A security graph (e.g., MICROSOFT's Intelligent Security Graph) can be provided as a component that provides telemetry data associated with a plurality of resources in a computing environment. The security graph may implement machine learning to generate actionable security alerts and recommendations. The security graph can be associated with an Application Programming Interface (API) that operates as an intermediary service to access a shared schema of aggregated security information from a plurality of security providers in a computing environment. In this way, the security graph and the security graph API can support integrating security alerts from different security providers via an API connector that streams alerts to a security management system.

In practice, it can be challenging to provide security query responses using only a security graph. By way of context, a security graph can be configured to connect to different types of services and devices to provide access to security data including security graph data. Accessing security data via the security graph provides different perspectives for analysis and developing insights from the security data associated with the security graph. The security graph may not be optimally configured to efficiently and adequately support various types of queries that are executed against the security graph when performing analysis. For example, a query to determine "which users have permissions to a database" may bypass contextual data that is relevant in understanding query results from the security graph; and further bypass contextual data that is relevant for additional investigation and remediation actions. For example, the query results may not include a group name of the group associated with granting the user permissions to the database, and may not identify users that will be impacted if group permissions are removed.

Moreover, retrieving this type of contextual data can be expensive if performed on the security graph. In particular, queries executed on the graph will increase in complexity and incur significant compute resources and time to provide query results—and additional contextual data—for the query. By way of illustration, a query would have to include query parameters that account for a user with $1$-$n$ group memberships until the permission assignment, and further account for the user getting permissions with different mechanisms, and that the permission can be granted via multiple architecture models and technologies.

A security graph layering engine supports generating a multi-layer security graph as a proxy representation for a security graph. The multi-layer security graph is an optimized representation of the security graph for different use-cases corresponding to a configuration layer, a presentation layer, and a query layer. Each layer can be constructed in an optimized manner for the queries that correspond to use-cases associated with the layers. In this way, a determination can be made of a type of security query (e.g., the type of security information that is requested) and based on the security query, one or more layers of the multi-layer graph are used to generate security query responses. Unlike security management systems that provide security data in only one layer, the multi-layer security graph supports use-cases based on the different layers and the combination of layers utilized in parallel. Generating the layers can be based on security graph layering operations as discussed in more detail below.

With reference to the configuration layer, the configuration layer is a data storage layer that stores data associated with entities in the configuration layer. The configuration layer can store data that corresponds to cloud configuration data of one or more entities in the cloud computing environment. An entity is mapped to configured objects that are impacted by configuration data corresponding to the entity. In this way, if a change is made to the configuration data associated with an entity the impacted configured objects of the entity can be identified. Moreover, a remediation plan of an attack scenario can be managed (e.g., generated, analyzed, and implemented) based on information that is retrieved from the configuration layer. Hierarchically speaking, the configuration layer can be the lowest representation layer.

In operation, raw data from a data source associated with one or more entities is retrieved. The one or more entities are mapped to a node on the configuration layer and references between entities are mapped to edges. The direction of the edge is from a referring entity to a referred entity. By way of example, permissions can be given based on 4 entities (e.g., a role definition, a role assignment, an identity, and a scope) so each instance of a permission corresponds to a node. The role definition, the identity, and the scope do not reference (and are not associated with any other entities), as such, no additional edges are generated for the role definition, the identity, or the scope. However, each role assignment refers to a role definition, an identity, and a scope, so an edge is generated from the role assignment to each reference (i.e., role assignment to role definition; role assignment to identity; and from role assignment to scope).

The presentation layer is an attack graph presentation layer. In particular, the presentation layer can be used to generate a graphical representation of a potential attack graph that is communicated to a security management client for display. The presentation layer can include a directed graph. The directed graph can be configured to store attack analysis data. For example, the attack analysis data can specifically provide information on how a first entity is accessible (or connected) to a second entity-sometimes via one or more intermediary entities. The attack analysis data can operate as a starting point for investigation and remediation of a threat.

In operation, configuration layer data from the configuration data is retrieved to generate the presentation layer and presentation layer data. In particular, one or more attack paths are identified in the configuration layer, where a first node should reach a second node based on the attack path walk-however, based on the configuration data, the second node is not reachable via the first node. The presentation layer supports three presentation layer operations: a remove-add operation, a set direction of edge operation, and a merge nodes operation. More specifically, remove any nodes that represent limitations on the attack path walk and add them as data on an edge; set the direction of the edge to be the direction of the security attack; and merge node that always creates a 1:1 connection.

As such, with respect to the permissions example, role definition is removed because it contains a set of permissions that the identity can perform, that do not change the existence of permissions. Then, the direction of the edge—from role assignment to role definition—is changed, such that, an attack walk can occur from identity to scope. Finally, role assignment is removed, because each instance will always have a 1:1 link between a specific instance of identity and specific instance of scope. Thus, the presentation layer of this segment is provided as: (identity)→(scope).

The query layer is a response generator layer. In particular, the query layer is configured to answer abstract questions in an efficient manner. In one implementation, in order to reduce query complexity, only a subset of entities (e.g., key entities) are provided in the query layer. In this way, data that is not relevant to security-oriented questions and queries are not included in the query layer. For example, a VM, storage, and user may exist in the query layer; however, a storage folder, a Kubernetes pod, and load balancer—that operate as logical containers—may be removed. A user (e.g., an administrator of a cloud computing environment) can communicate a query (e.g., via a security management client) for an attack scenario instead of listing a number of possible combinations of entities that can generate an effect.

In operation, the query layer is simplified based on a plurality of query layer operations. By way of illustration, a pattern definition operation supports defining a pattern over a presentation layer to be abstracted into a query layer. For example, (user)-[member of]→(group)-[member of]→(group)-[has permissions on]→(cloud computing subscription)-[contains]→(resource group)-[contains]→(VM).

A function definition operation supports transforming a presentation layer pattern into a query layer pattern. In the example above, the function will check whether the permissions definition of each node results with (a user) having permissions to a specific entity (e.g., VM).

A pattern matching operation can be performed using a pattern matching algorithm over the graph to detect matches of each defined pattern. For each match, a function application operation is performed, to apply a function (i.e., function definition operation) and create a single query layer edge where applicable. In this way, only patterns which are represented in a walkable path result in a (source_node→[destination_node] with the remaining nodes abstracted away. For the example pattern above, only when a user has permissions to the VM, then the pattern will be transformed to (user)→(VM). The resulting graph will contain walkable edges between key entities abstracting away intermediate edges and nodes.

Advantageously, the embodiments of the present technical solution include several inventive features (e.g., operations, systems, engines, and components) associated with a security management system having a security graph layering engine. The security graph layer engine support security graph layer operations that include generating a multi-layer security graph based on a security graph; generating query results for security queries using the multi-layer security graph that includes the configuration layer, the presentation layer, and the query layer; and providing security management operations and interfaces-via a security graph layering engine that supports security incident management in a security management system. The security graph layer operations are a solution to a specific problem (e.g., limitations in how security data is stored and retrieved for security queries) in security management. The multi-layer graph provides a data structure for storing and retrieving security information in a way that improves computing operations in a security management system. Moreover, large amounts of security information that is stored for a cloud computing system can be summarized and presented in a particular manner to improve user interfaces of the security management system.

Example Systems and Operations

Aspects of the technical solution can be described by way of examples and with reference to FIGS. 1A-1F. FIG. 1A illustrates a cloud computing environment (system) 100 and security management system 100A. The security management system 100A includes network 100B, security graph layering engine 110 with multi-layer security graph 170, security incident management engine 120 with security incident graph API 122, security management client 130 with security incident management client 132 and the security incident interface data 134; and security graph 140.

The cloud computing environment 100 provides computing system resources for different types of managed computing environments. For example, the cloud computing environment 100 supports delivery of computing services-including servers, storage, databases, networking, and security intelligence. A plurality of security management clients (e.g., security management client 130) include hardware or software that access resources in the cloud computing environment 100. Security management client 130 can include an application or service that supports client-side functionality associated with cloud computing environment 100. The plurality of security management clients can access computing components of the cloud computing environment 100 via a network (e.g., network 100B) to perform computing operations.

The security management system 100A is designed to provide security incident management using the security graph layering engine 110. The security management system 100A provides an integrated operating environment based on a security management framework of computing components associated with generating a multi-layer security graph based on a security graph and generating query results for security queries using the multi-layer security graph having a configuration layer, a presentation layer, and a query layer. The security management system 100A integrates security graph layering operations-generate the configuration layer, the presentation layer, and the query layer based on data associated with the security graph-into security management operations and interfaces to effectively provide security incident information and security posture information and remediation information for a computing environment. For example, a security administrator can investigate an ongoing threat in a computing environment based on a security query for security incident management information that is provided using a configuration layer, a presentation layer, and query layer. The security incident management information is the multi-layer security graph is generated based on security graph layering operations that optimizes querying the security graph for query results comprising security incident management information.

The security graph layering engine 110 is responsible for generating the multi-layer security graph 170 based on security graph layering operations. The multi-layer security graph 170 can be communicated to the security incident management engine 120 to support providing security incident management. For example, the security incident management engine 120 may execute security queries using the multi-layer security graph 170 to generate query results that can be incorporated in security incident management functionality. In particular, the security incident may evaluate a security query (e.g., based on information requested by the security query) and identify one or more layers in the multi-graph layer that should be used for executing the security query for identifying security incident management information. Query results including security incident information can be identified using the multi-layer security graph and communicated to the security management client 130. In this way, the security graph layering engine 110 operates with security management system components (e.g., security incident management engine 120) to provide security incident management.

The security incident management engine 120 is responsible for communicating with a security management client 130 having the security incident management client 132 and the security incident interface data 134. The security incident management client 132 supports client-side security incident management operations for providing security management in the security management system. The security incident management client 132 can support generating the multi-layer graph 170, communicating security queries to generate query results, presenting a security posture visualization including query results, and communicating an indication to perform a remediation action for an alert associated with a security incident. As such, the security incident interface data 134 can include data associated with the security graph layer engine 120 and data associated with the security incident management engine 120 which can be communicated between the security graph layering engine 110, the security incident management engine 120, and the security management client 130.

The security incident management engine 120 operates to provide visibility to security status of resources in a computing environment. Security posture information can be associated with network, data, and identity resources of a computing environment. Security posture information can include security incident management information as described herein. Security posture information can specifically include query results associated security queries executed using the multi-layer security graph 170. The security incident management engine 120 includes a security graph API 122 that provides access to the security graph 140 and security graph data. The security graph 140 provides telemetry data associated with a plurality of resources in a computing environment. In particular, the telemetry data can be security data that is associated with security providers in a computing environment. The security graph 140 and security graph API 122 can support integrating security alerts from different security providers via an API connector that streams alerts to the security incident management engine 120.

The security incident management engine 120 can further support generating security posture visualizations based on the security posture information including query results from security queries executed on the multi-layer security graph 170, attack path analysis, security data for alerts and security incidents, and security incident management information. For example, a security posture visualization can provide query results as security posture information. The security posture visualizations can specifically identify query results based on a particular layer of the multi-layer security graph 150 associated with the query results.

The security management client 130 can support accessing a security posture visualization and causing display of the security posture visualization. The security management client 130 can include a security incident management client 132 that supports receiving the security incident interface data 134 from the security management system 110A and causing presentation of the security incident interface data 134. The security incident interface data 134 can specifically include security posture visualization associated with the security incident. The secure posture visualization can further include remediation actions associated different alerts-including alerts that are associated with security incidents.

The security management client 130 can further support executing a remediation action. In particular, the security posture visualization can include a remediation action for an alert associated with a security incident. The security management client 130 can receive an indication to perform the remediation action associated with the security incident. Based on receiving the indication to execute the remediation action, the security management client 130 can communicate the indication to execute the remediation action to cause execution of the remediation action.

As such, query results are more efficiently generated based on the multi-layer security graph 170 and provided with remediation actions that can be selected and communicated to cause the remediation action to be performed. The remediation action can address an actual threat or potential threat associated with the security incident and alert. For example, a remediation action can include off-boarding a computing device, disabling a user, quarantining a file; turning off external email, or running an antivirus scan. Other variations and combinations of security posture visualizations with security incidents, alerts, and remediation actions are contemplated with embodiments described herein.

Figure 1B:
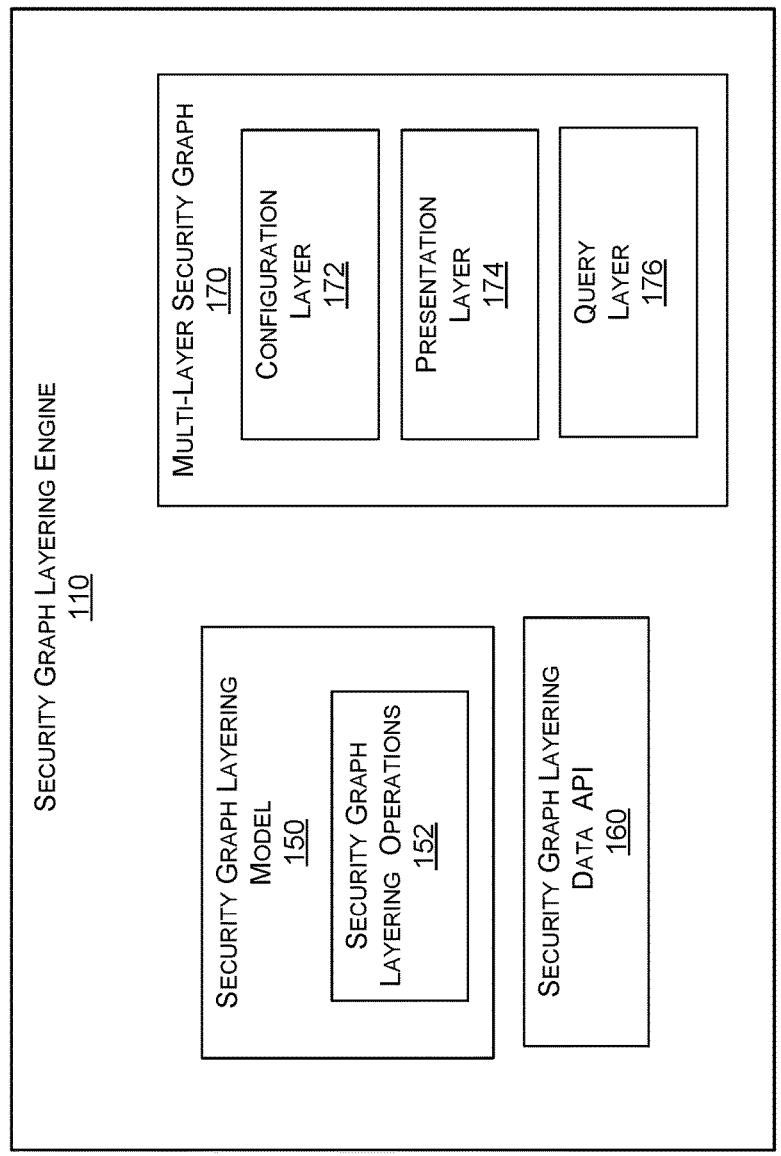

With reference to FIG. 1B, FIG. 1B illustrates security graph layering engine 110, security graph layering graph model 150 with security graph layering operations 152; security graph layering data API 160, and multi-layer security graph 170 having configuration layer 172, presentation layer 174, query layer 176.

The security graph layering model 150 is a computational model that supports generating the multi-layer security graph. The computational model is configured to access security data and generate the multi-layer security graph as a representation of the security graph. The computational model supports programmatically constructing and deriving security data into the multi-layer security graph 170 with configuration layer 172, presentation layer 174, and query layer 176. The security graph layering model can include security graph layer operations that are executed to generate the different layers of the multi-layer security graph 170. The security graph layer operations can specifically include operations associated with generating each of the layers (i.e., configuration layer, presentation layer, and query layer) of the multi-security graph. The security graph layering engine 110 can further include a security graph layering data API that supports retrieving different types of security data and accessing the security graph for performing the security graph layering operations 152 to generate the multi-layer security graph 170.

The security graph layering operations can include operations for generating the configuration layer 172, presentation layer 174, and query layer 176. For generating the configuration layer 172, raw data of one or more entities of the cloud computing system is retrieved. The one or more entities are mapped to a node on the configuration layer and references between entities are mapped to edges. For generating the presentation layer, configuration layer data from the configuration data is retrieved to generate the presentation layer and presentation layer data. In particular, one or more attack paths are identified in the configuration layer, where a first node should reach a second node based on the attack path walk-however, based on the configuration data, the second node is not reachable via the first node. The presentation layer supports three presentation layer operations: a remove-add operation, a set direction of edge operation, and a merge nodes operation. And for generating the query layer, a pattern definition operation supports defining a pattern over a presentation layer to be abstracted into a query layer, a function definition operation supports transforming a presentation layer pattern into a query layer pattern, a pattern matching operation supports using a pattern matching algorithm over the graph to detect matches of each defined pattern, and a function application operation supports create a single query layer edge. The operations support generating a query layer graph that contains walkable edges between key entities, while abstracting away intermediate edges or nodes.

Figure 1C:
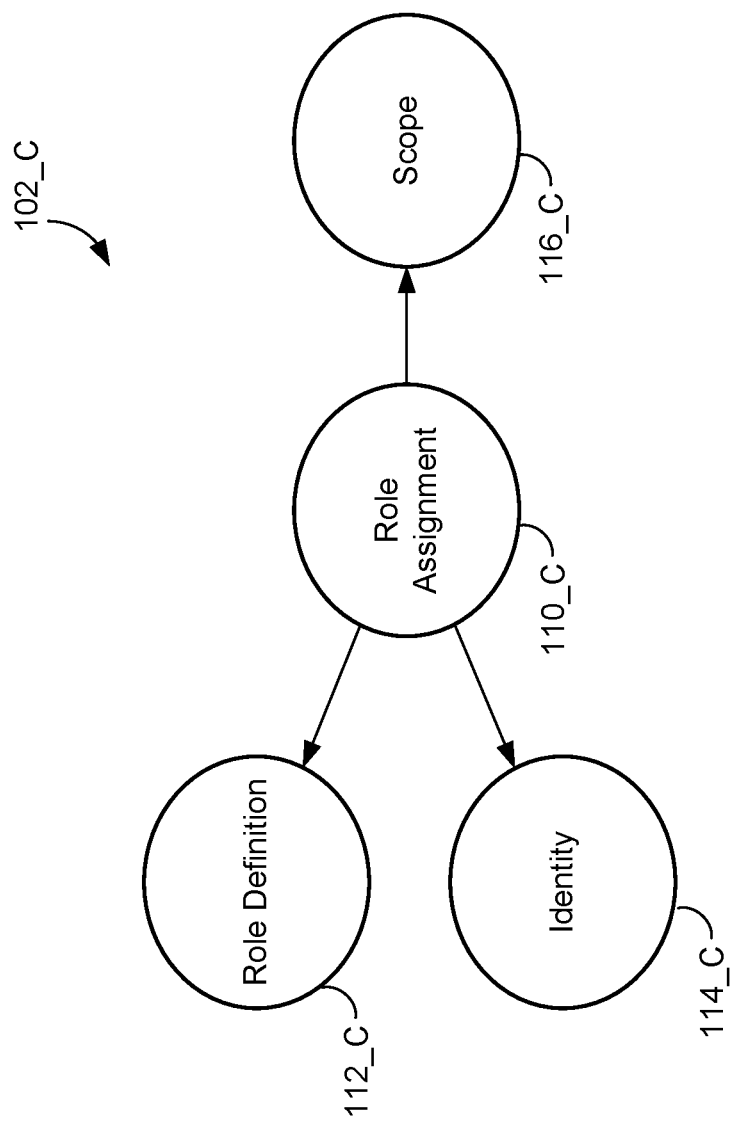
FIGS. 1C-1G are exemplary security graph layering schematics of the multi-layer security graph, in accordance with aspects of the technology described herein.

With reference to FIG. 1C, FIG. 1C illustrates a security graph layering schematic 102_C with a plurality of nodes including: role assignment 110_C, role definition 112_C, identity 114_C, and scope 116_C. 102_C is schematic representation of a permission assignment in a cloud computing system. A permission can be give based on 4 entities (i.e., role assignment 110_C, role definition 112_C, identity 114_C, and scope 116_C). The role definition 112_C, identity 114_C, and scope 116_C do not reference (and are not associated with other entities), as such no additional edges are generated for those entities. However, each role assignment 110_C refers to the role definition 112_C, identity 114_C, and scope 116_C.

Figure 1D:
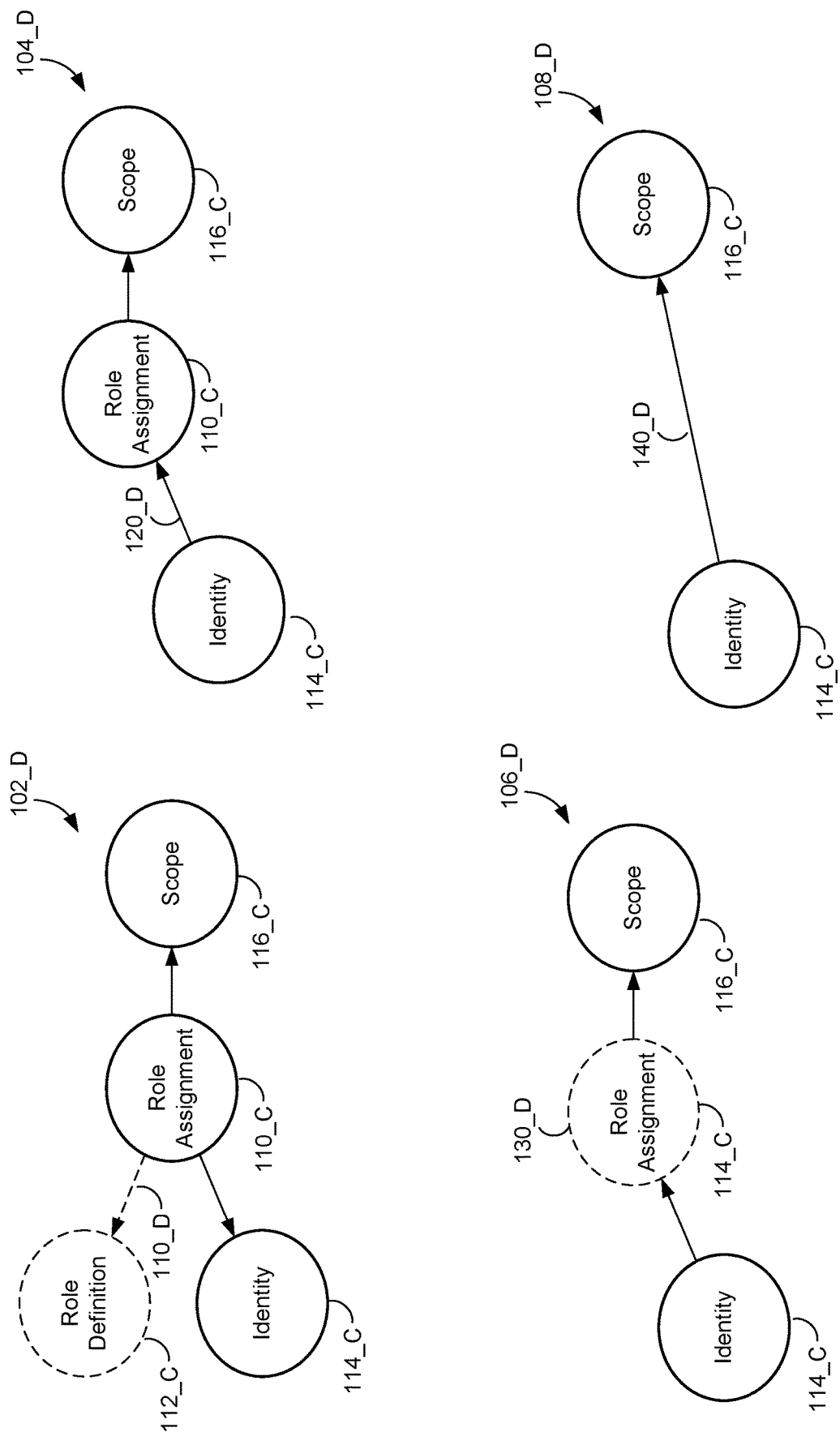

With reference to FIG. 1D, FIG. 1D illustrates a plurality of schematics including security graph layering schematic 102_C with a plurality of nodes including: role assignment 110_C, role definition 112_C, identity 114_C, and scope 116_C. The role definition 112_C is removed 110_D. The role definition 112_C is removed because it contains a set of permissions that the identity can perform, as such, it does not affect the existence of the permission. In security graph layering schematic 104_D, the direction of the edge 120_D from the role assignment 110_D to the identity 114_C is reversed. As such, an attack walk from identity scope can occur.

In security graph layering schematic 106_D, role assignment 114_C is removed 130_D. Each instance of role assignment will always have a 1:1 link between a specific instance of identity and a specific instance of scope and does not add additional information. And, after executing security graph layering operation, the security graph layering schematic 108_D is left with a presentation layer having identity 114_C and scope 116_C with the edge direction 130_D from identity 114_C to scope 116_C.

Figure 1E:
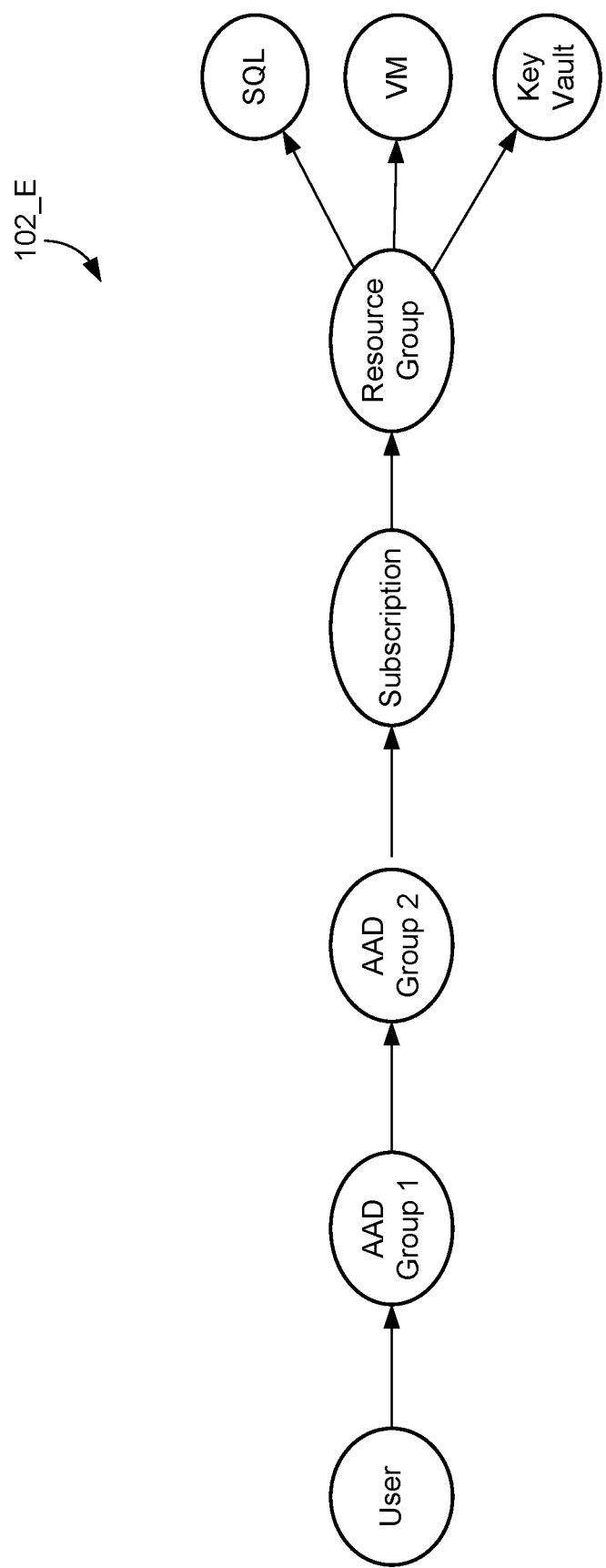
Figure 1F:
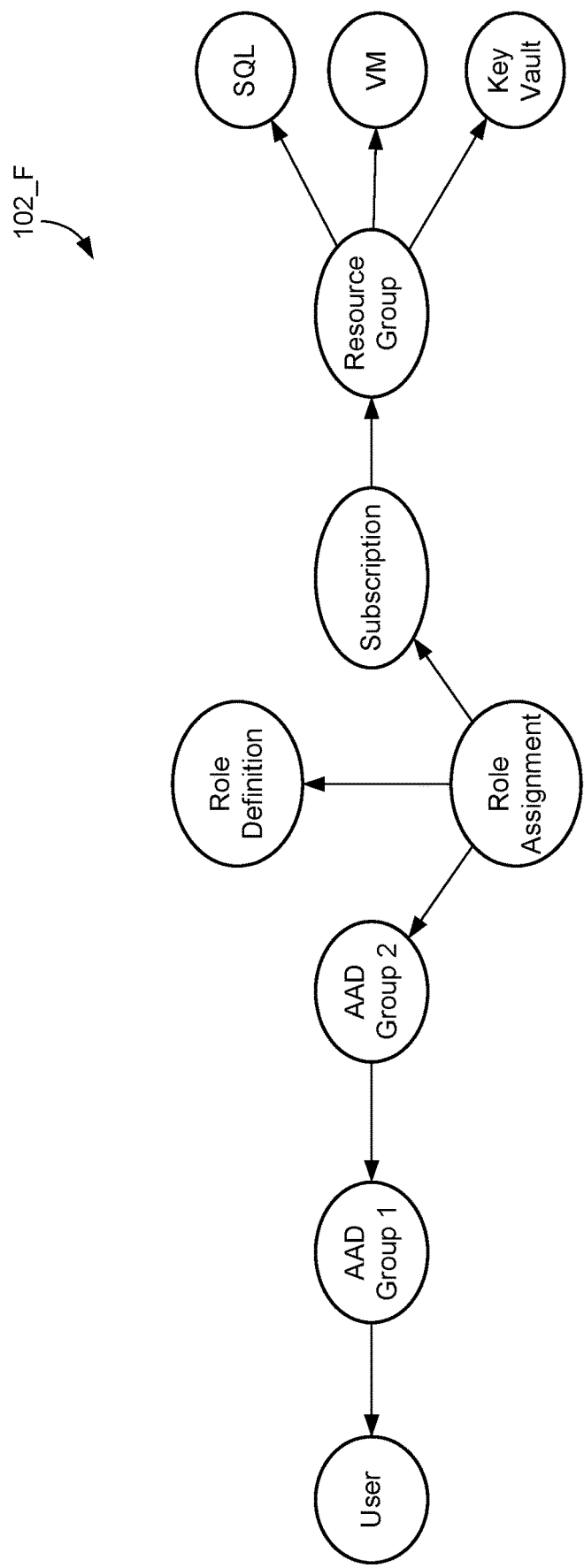
Figure 1G:
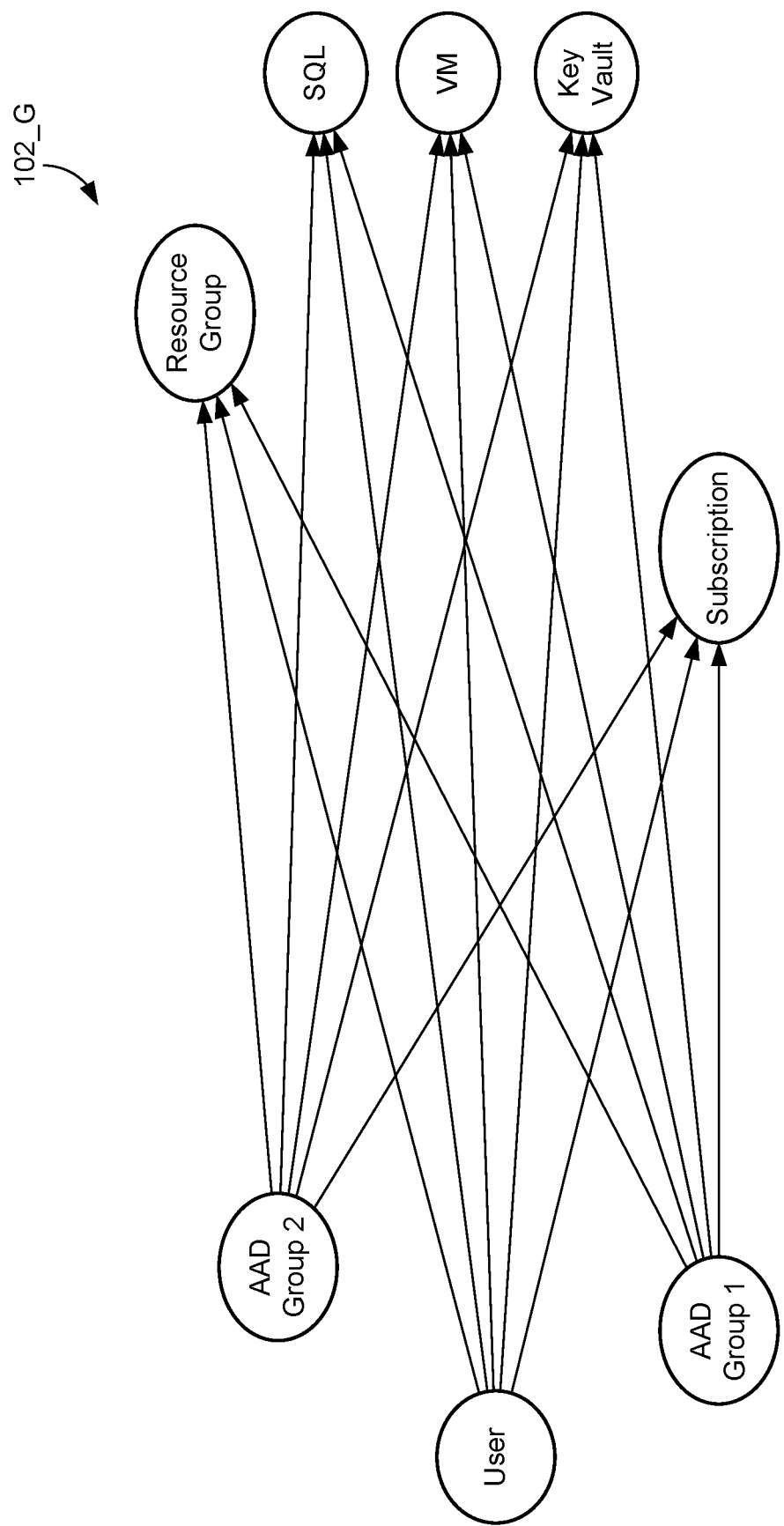

With reference to FIGS. 1E, 1F, and 1G, FIG. 1E illustrates a security graph layering schematic 102_E with a plurality of nodes in the configuration layer. In the configuration layer, the security graph layering schematic 102_E includes all the relevant native entities for permission assignment of a user to a few resources via a membership. The direction of the edges is based on the native data, from the referring entity to the referenced entity.

FIG. 1F illustrates a security graph layering schematic 102_F with a plurality of nodes in the presentation layer. In the presentation layer, the security graph layering schematic 102_F allows walking from any possible attacker entity to any possible attacked entity. This information can be determined visually-illustrating how a permission is granted, and which links can be removed to break a possible attack.

FIG. 1G illustrates a security graph layering schematic 102_G with a plurality of nodes in the query layer. The security graph layering schematic 102_G allows walking from any possible attacker entity to any possible attacked entity as well; however with only a single hop. An example security query (e.g., "which user can access a VM" or "which groups have permission on a subscription") can be generated efficiently.

Figure 2A:
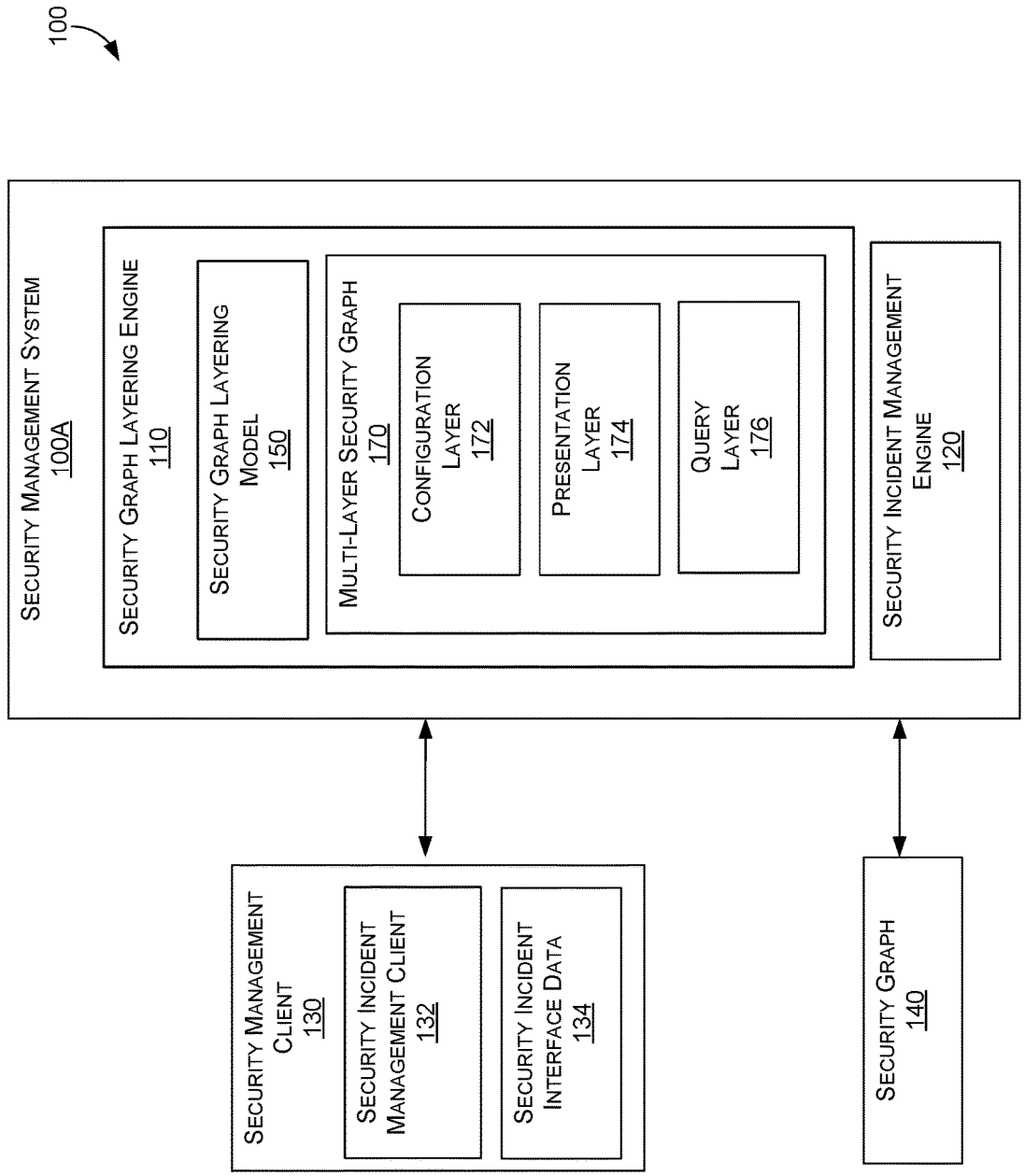
FIG. 2A is a block diagram of an exemplary security management system including a security graph layering engine, in accordance with aspects of the technology described herein.
Figure 2B:
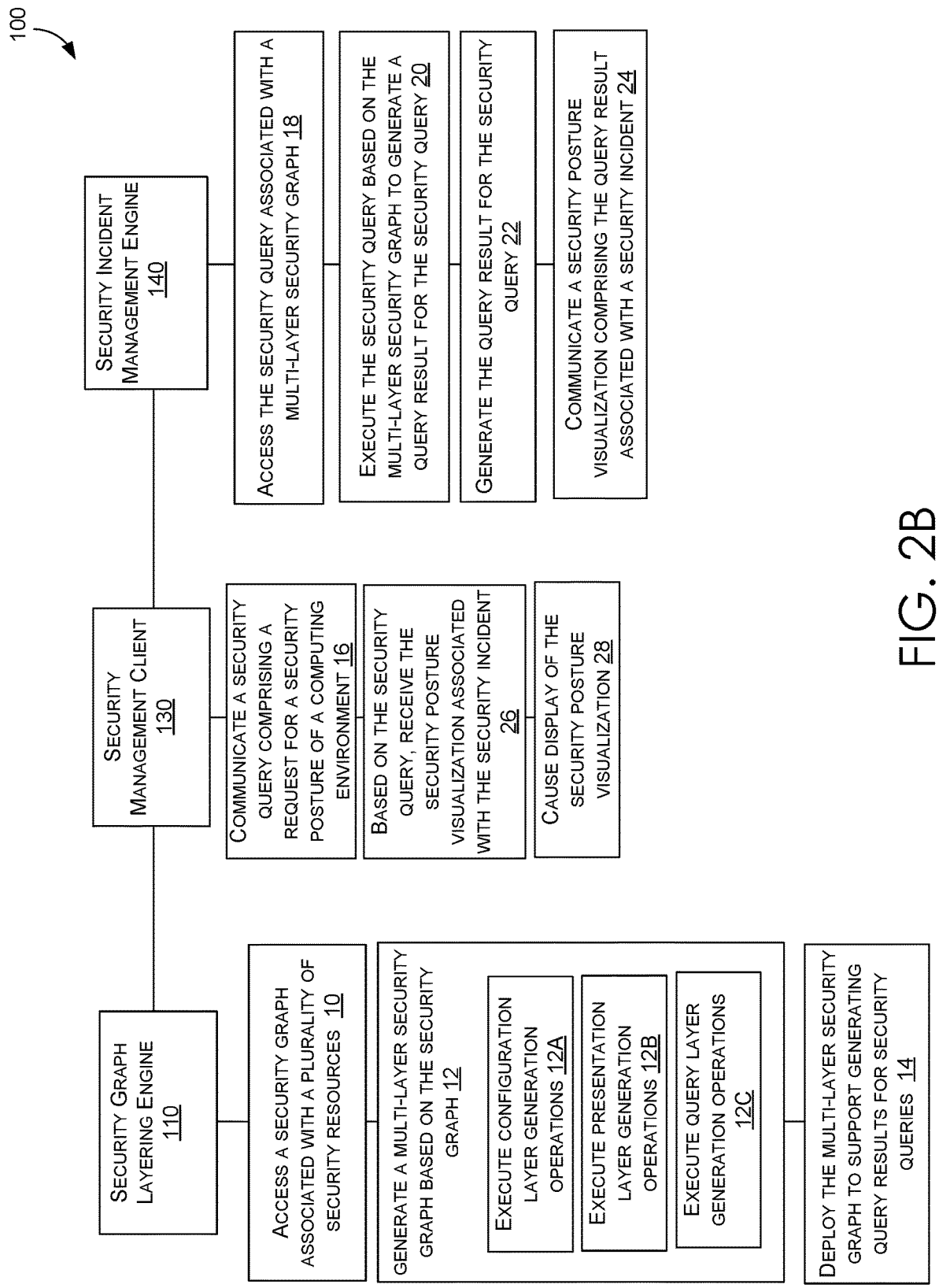
FIG. 2B is a block diagram of an exemplary security management system including a security graph layering engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example cloud computing system 100 in which methods of the present disclosure may be employed. In particular, FIG. 2A shows a high level architecture of the cloud computing system 100 in accordance with implementations of the present disclosure. Among other engines, managers, generators, selectors, or components not shown (collectively referred to herein as "components"), the technical solution cloud computing system 100 corresponds to FIGS. 1A and 1B.

With reference to FIG. 2A, FIG. 2A illustrates a security management system 100A having security graph layering engine 110, security incident management engine 120, and security management client 130 with security incident management client 132 and security incident interface data 134; and security graph 140. The security layering engine 110 includes the security graph layering model 150 and multi-layer security graph 170 with configuration layer 172, presentation layer 174, and query layer 176.

The security graph layering engine 110 is responsible for generating and deploying the multi-layer security graph 170 for generating query results. The security graph layering engine accesses the security graph 140 that is associated with a plurality of security resources in a computing environment. The security graph 140 is a centralized service that provides a unified API to access security data associated with the plurality of security resources. Accessing the security graph includes accessing security data that is selectively integrations into specific layers of the multi-layer security graph 170.

The security graph layering engine 110 generates the multi-layer graph as a proxy representation of the security graph. The security graph layering engine 110 can employ a security graph layering model and security graph layering operations to generate the multi-layer graph. The multi-layer graph includes the configuration layer 172, the presentation layer 174, and query layer 176. The configuration layer 172 stores cloud configuration data associated with one or more entities in the cloud computing environment. An entity is mapped to a configured object that is impacted by configuration data corresponding to the entity. A change associated with a remediation action of a security incident can correspond to configuration data of an entity in the configuration layer. The entity is mapped to one or more configured objects that are impacted by the configuration data—and any changes to the configuration data identified in the remediation action.

The presentation layer 176 is an attack graph presentation layer that includes a directed graph having a first entity connected to a second entity based on an attack path. A potential attach graph is generated based on the presentation layer, where an attack path associated with a security incident is generated based on the presentation layer. The attack path includes a first entity connected to a second entity based on the attack path. The query layer 176 is a response generator layer that includes a path between a source node entity and a destination node entity based on a pattern that abstracts out one or more entities. A single query layer edge is generated between a source node entity and a destination node entity based on a pattern definition associated with the query layer. Upon generating the multi-layer security graph 170, the multi-layer security graph can be deployed.

The security incident management engine 120 is responsible for using the multi-layer security graph 170 to generate query results for security queries. The security incident management engine 120 accesses a security query associated with the multi-layer security graph 170. The security query may explicitly or implicitly include information that identifies one or more layers of the multi-layer security graph that should be used to execute the security query. The multi-layer security graph is a proxy representation of a security. The multi-layer graph includes a plurality of layers comprising selectively integrated security graph data associated with the security graph. Each layer is associated with a set of layer generation operations for identifying multi-layer graph data that corresponds to each layer.

The security incident management engine 120 executes a security query based on a multi-layer security graph. Executing the security query can include determining that the security query is associated with one or more layers of the multi-layer security graph, such that, the security query is executed based on the one or more layers associated with the security query. Executing the security query includes generating a query result for the security query. The security incident management engine 120 can communicate the query result. The query result can be communicated to cause generation of the query result on a security management client. The security incident management engine 120 may also support generating a security posture visualization that includes the query results.

The security management client 130 is responsible for causing display of security posture visualizations that include query results. The security management client 130 can communicate a request for security posture information of a computing environment. Based on the request, a security posture visualization is a received. The security posture visualization includes a query result associated with a security query. The query result is associated with a remediation action, the remediation action is executable to address a security threat associated with the query result.

With reference to FIG. 2B, FIG. 2B illustrates a cloud computing system having security graph layering engine 110, security management client 130, and security incident management engine 120.

At block 10, the security graph layering engine 110 accesses a security graph associated with a plurality of security resources. The plurality of security resource can be associated with one or more computing environments including a cloud computing environment or an on-premise computing environment. At block 12, the security graph layering engine 110 generates a multi-layer security graph based on the security graph; generating the multi-layer security graph includes: at block 12A, executing configuration layer generation operations; at block 12B, executing presentation layer generation operations; and at block 12C, executing query layer generation operations. At block 14, the security graph layer engine deploys the multi-layer security graph to support generating query results for security queries.

At block 16, the security management client 130 communicates a security query comprising a request for security posture of a computing environment. At block 18, the security incident management engine 120 accesses the security query associated with the multi-layer security graph; at block 20, executes the security query based on the multi-layer security graph to generate a query result for the security query; and at block 22, generates the query result for the security query. At block 24, the security incident management engine 120 communicates a security posture visualization comprising the query result associated with a security incident. At block 26, the security management client, based on the security query, receives the security posture visualization associated with the security incident; and at block 28, causes display of the security posture visualization.

Example Methods

Figure 3:
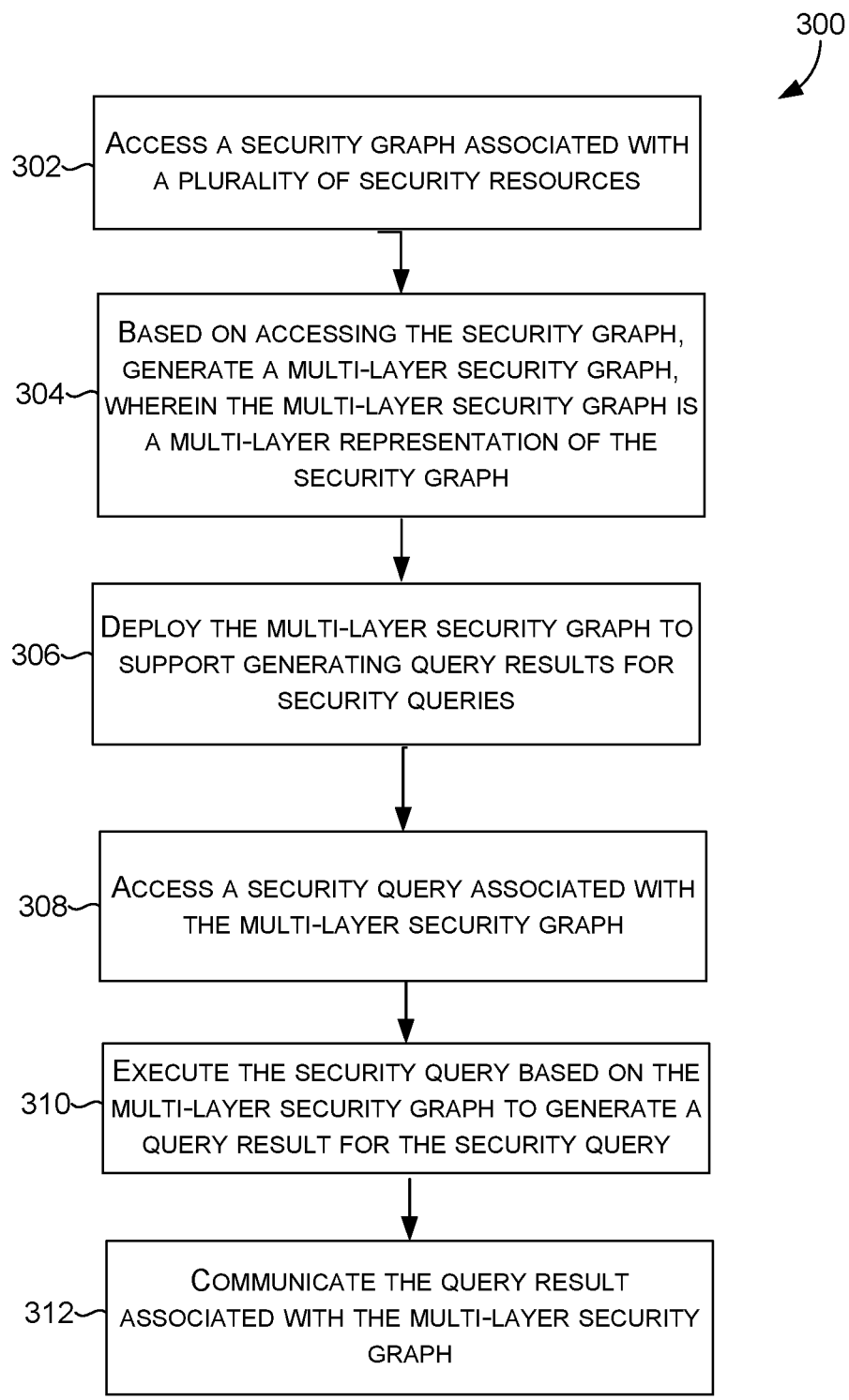
FIG. 3 provides a first exemplary method of providing security incident management using a security graph layering engine, in accordance with aspects of the technology described herein.
Figure 4:
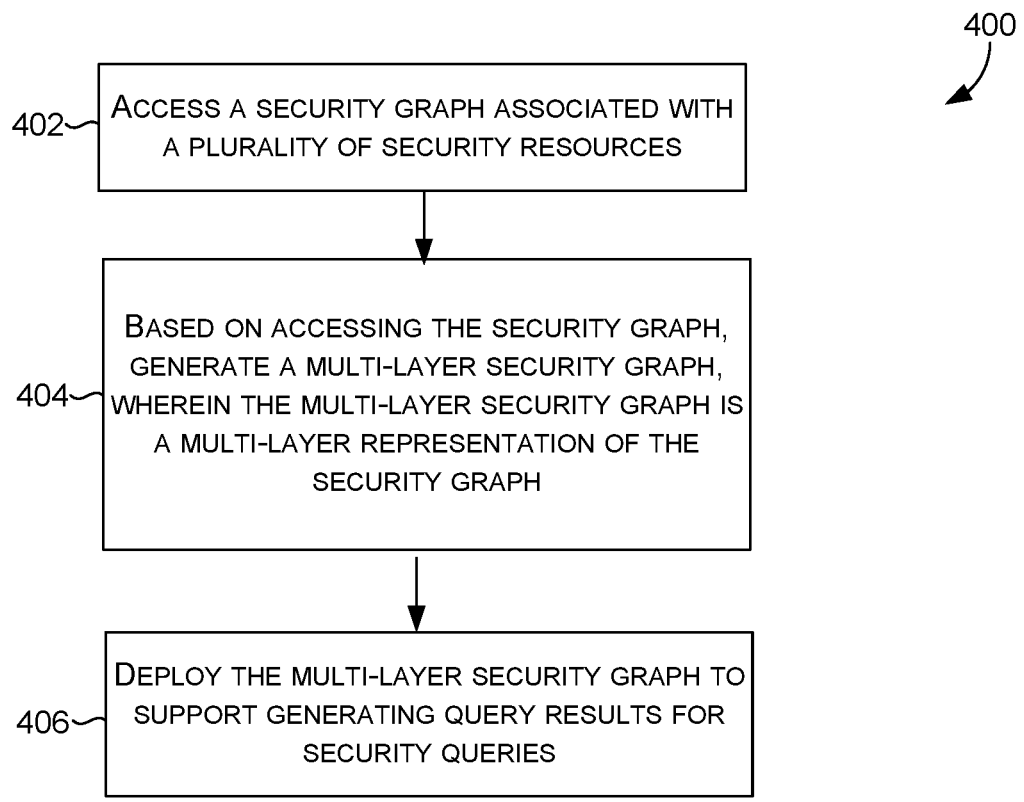
FIG. 4 provides a second exemplary method of providing security incident management using a security graph layering engine, in accordance with aspects of the technology described herein.
Figure 5:
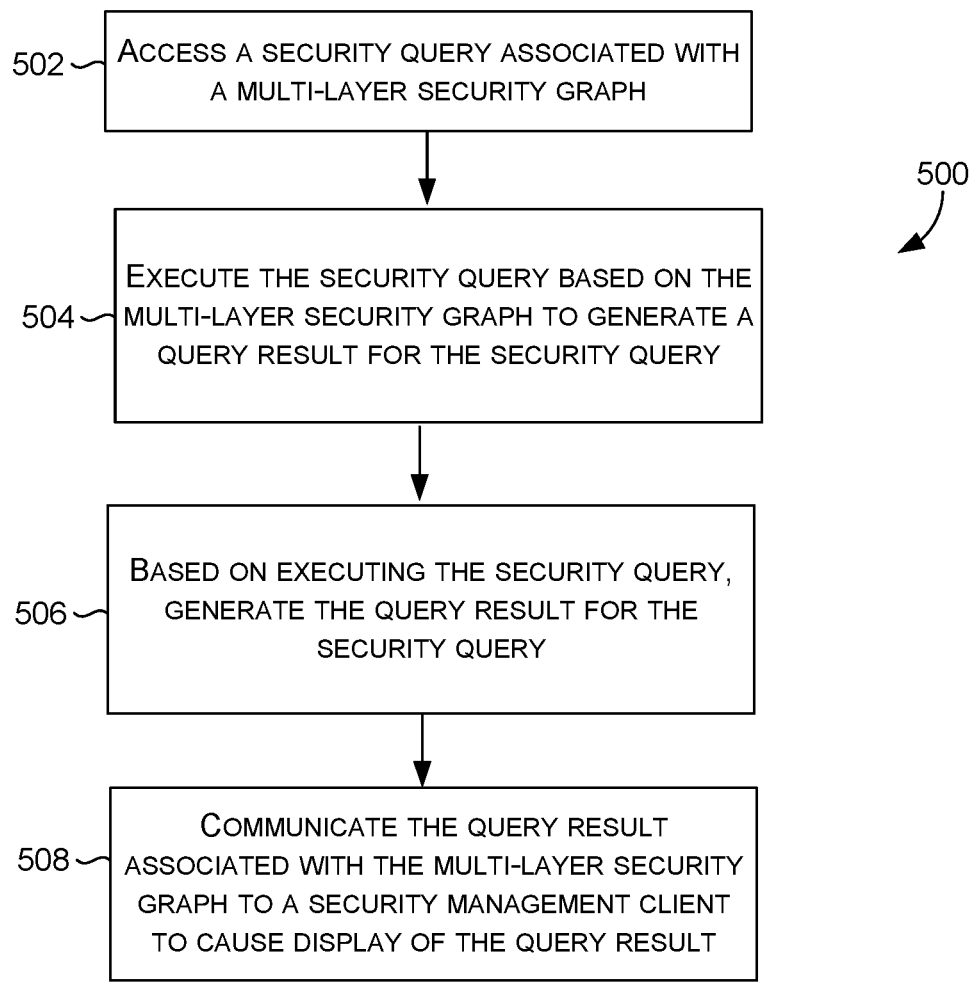
FIG. 5 provides a third exemplary method of providing security incident management using a security graph layering engine, in accordance with aspects of the technology described herein.

With reference to FIGS. 3, 4, and 5, flow diagrams are provided illustrating methods for providing security incident management using a security graph layering engine in a security management system. The methods may be performed using the security management system described herein. In embodiments, one or more computer-storage media having computer-executable or computer-useable instructions embodied thereon that, when executed, by one or more processors can cause the one or more processors to perform the methods (e.g., computer-implemented method) in the security management system (e.g., a computerized system).

Turning to FIG. 3, a flow diagram is provided that illustrates a method 300 for providing security incident management using a security graph layering engine in a security management system. At block 302, a security graph associated with a plurality of security resources is accessed. At block 304, based on accessing the security graph, a multi-layer security graph is generated, wherein the multi-layer security graph is a multi-layer representation of the security graph. At block 306, the multi-layer security graph to support generating query results for security queries is deployed. At block 308, a security query associated with the multi-layer security graph is accessed. At block 310, the security query is executed based on the multi-layer security graph to generate a query result for the security query. At block 312, the query result associated with the multi-layer security graph is communicated.

Turning to FIG. 4, a flow diagram is provided that illustrates a method 400 for providing security incident management using a security graph layering engine in a security management system. At block 402, a security graph associated with a plurality of security resources is accessed. At block 404, based on accessing the security graph, a multi-layer security graph is generated, the multi-layer graph is a multi-layer representation of the security. At block 406, the multi-layer security graph is deployed to support generating query results for security queries.

Turning to FIG. 5, a flow diagram is provided that illustrates a method 500 for providing security incident management using a security graph layering engine in a security management system. At block 503, a security query associated with a multi-layer security graph is accessed. At block 504, the security query is executed based on the multi-layer graph to generate a query result for the security query. At block 506, the query result associated with the multi-layer security graph is communicated to a security management client to cause display of the query result.

Technical Improvement

Embodiments of the present invention have been described with reference to several inventive features (e.g., operations, systems, engines, and components) associated with a security management system. Inventive features described include: operations, interfaces, data structures, and arrangements of computing resources associated with providing the functionality described herein relative to reference to a security graph layering engine. Functionality of the embodiments of the present invention have further been described, by way of an implementation and anecdotal examples—to demonstrate that the operations for providing the security graph layering engine as a solution to a specific problem in security management technology to improve computing operations in security management systems. For example, three different layer representations of security data are used to generate a multi-layer security graph that is strategically and selectively used for generate query results for security queries. Overall, these improvements result in less CPU computation, smaller memory requirements, and increased flexibility in security management systems when compared to previous conventional security management system operations performed for similar functionality.

ADDITIONAL SUPPORT FOR DETAILED DESCRIPTION

Example Distributed Computing System Environment

Figure 6:
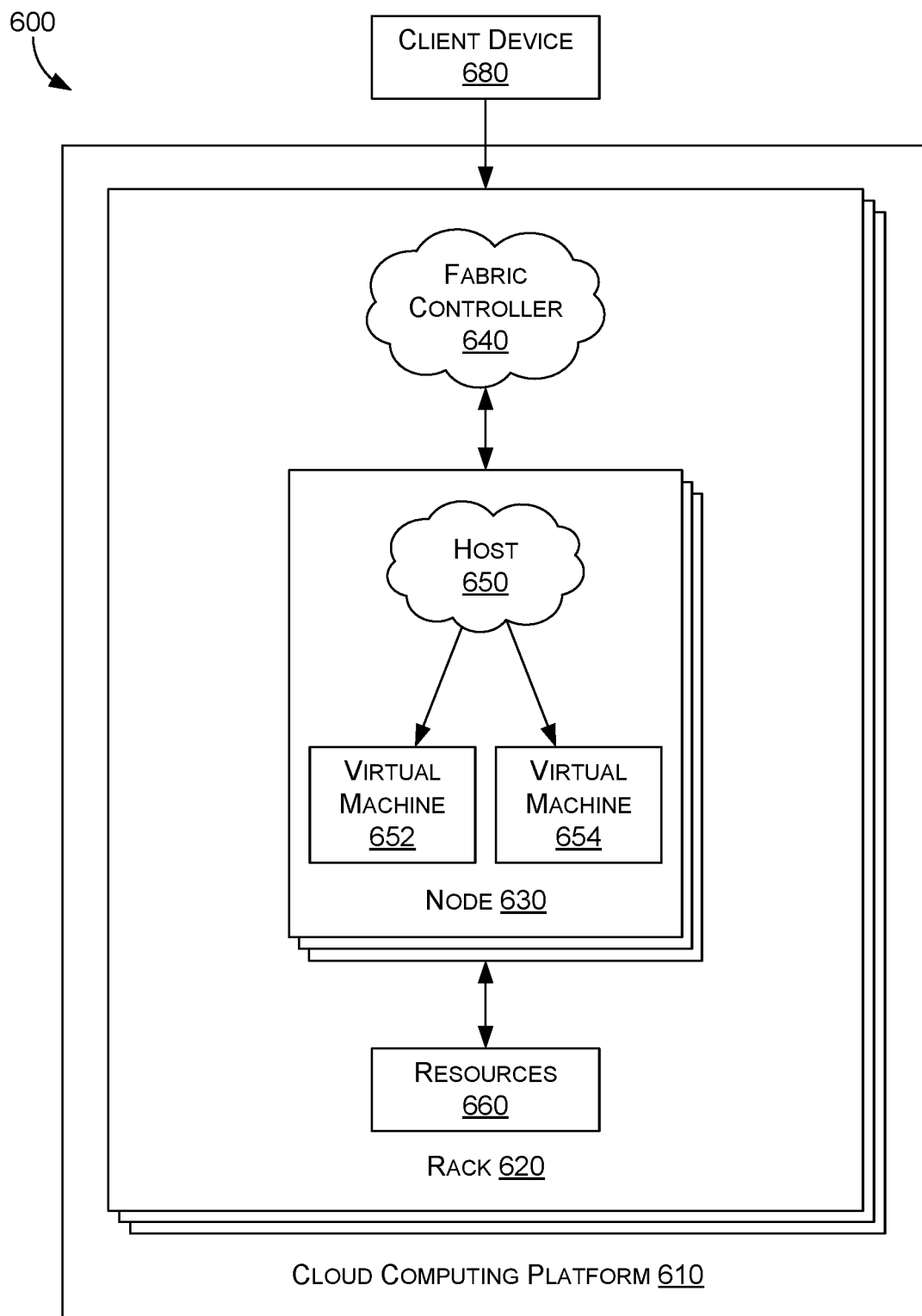
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
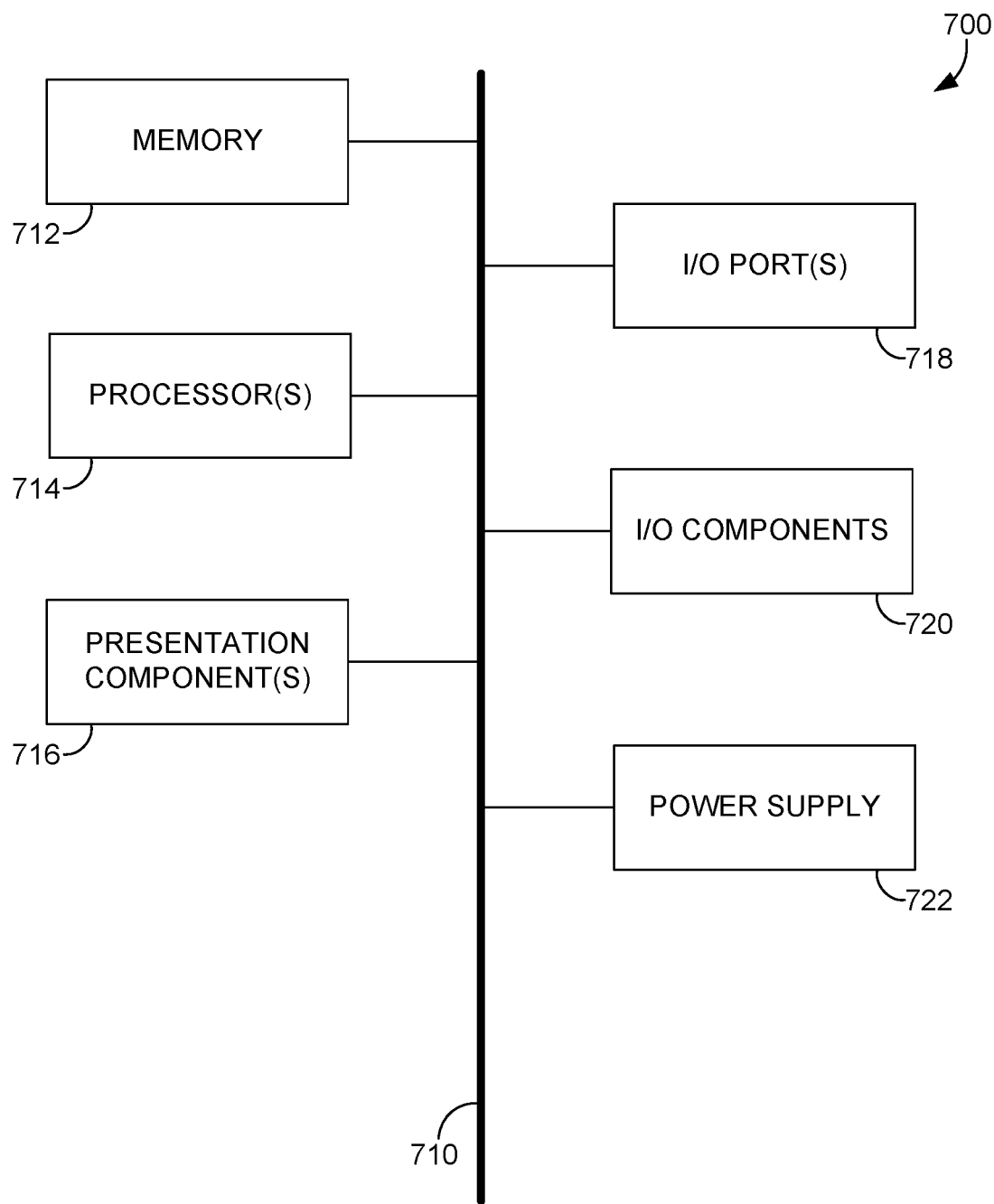
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "worksta-tion," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:
accessing a security graph associated with a plurality of security resource;
generating a multi-layer graph as a proxy representation of the security graph, the multi-layer graph comprising a configuration layer, a presentation layer, and a query layer, wherein the multi-layer graph is programmatically constructed as a query-optimized proxy representation of the security graph, the multi-layer graph associated with different types of security queries corresponding to at least one of: the configuration layer associated with configuration data, the presentation layer associated with attack path analysis, and the query layer associated with abstracted query responses;
deploying the multi-layer graph to support generating query results for security queries;
accessing a security query associated with the multi-layer security graph;
executing the security query based on the multi-layer security graph, wherein executing the security query comprises generating a query result for the security query; and
communicating the query result.

2. The system of claim 1, wherein the plurality of security resources are associated with one or more computing environments associated with the security graph, wherein the security graph is a centralized service that provides a unified Application Programming Interface to access security data associated with the plurality of security resources, wherein accessing the security graph comprises accessing the security data that is selectively integrated into the configuration layer, the presentation layer, and the query layer of the multi-layer security graph.

3. The system of claim 1, wherein the configuration layer stores cloud configuration data associated with one or more entities in the cloud computing environment, wherein an entity is mapped to a configured object that is impacted by configuration data corresponding to the entity.

4. The system of claim 1, wherein the presentation layer is an attack graph presentation layer comprising a directed graph comprising a first entity connected to a second entity based on an attack path.

5. The system of claim 1, wherein the query layer is a response generator layer comprising a path between a source node entity and a destination node entity based on a pattern that abstracts out one or more entities.

6. The system of claim 1, wherein a change associated with a remediation action of a security incident corresponds to configuration data of an entity in the configuration layer, wherein the entity is mapped to one or more configured objects that are impacted by the configuration data.

7. The system of claim 1, wherein a potential attack graph is generated based on presentation layer; wherein an attack path associated with a security incident is generated based the presentation layer, the attack path comprising a first entity connected to a second entity based on the attack path.

8. The system of claim 1, wherein a single query layer edge is generated between a source node entity and a destination node entity based on a pattern definition associated with the query layer.

9. The system of claim 1, the operations further comprising:
communicating, from a security management client, the request for the security posture of the computing environment;
based on the request, receiving a security posture visualization associated with the computing environment, wherein the security posture visualization comprises the query result; and
causing display of the security posture visualization comprising the query result.

10. The system of claim 1, further comprising a security incident management engine that supports generating a security posture visualization comprising query result is associated with a remediation action, wherein the remediation action is executable to address a security threat associated with the query result.

11. One or more computer-storage media having computer-executable instructions embodied thereon that, when executed by a computing system having a processor and memory, cause the processor to perform operations, the operations comprising:
accessing a security query associated with a multi-layer security graph, wherein the multi-layer security graph is a proxy representation of a security graph associated with a plurality of security resources, wherein the multi-layer graph comprises a configuration layer, a presentation layer, and a query layer,
wherein the multi-layer graph is programmatically constructed as a query-optimized proxy representation of the security graph, the multi-layer graph associated with different types of security queries corresponding to at least one of: the configuration layer associated with configuration data, the presentation layer associated with attack path analysis, and the query layer associated with abstracted query responses;
executing the security query based on the multi-layer security graph, wherein executing the security query comprises generating a query result for the security query; and
communicating query result to cause generation of the query result on a security management client.

12. The media of claim 11, wherein the multi-layer graph comprises a plurality of layers comprising selectively integrated security graph data associated with the security graph, wherein each layer is associated with a set of layer generation operations for identifying multi-layer graph data that corresponds to each layer.

13. The media of claim 11,
wherein the configuration layer stores cloud configuration data associated with one or more entities in the cloud computing environment, wherein an entity is mapped to a configured object that is impacted by configuration data corresponding to the entity;
wherein the presentation layer is an attack graph presentation layer comprising a directed graph comprising a first entity connected to a second entity based on an attack path; and
wherein the query layer is a response generator layer comprising path between a source node entity and a destination node entity based on a pattern that abstracts out one or more entities.

14. The media of claim 11, wherein a change associated with a remediation action of a security incident corresponds to configuration data of an entity in the configuration layer, wherein the entity is mapped to one or more configured objects that are impacted by the configuration data;
wherein a potential attack graph is generated based on presentation layer; wherein an attack path associated with a security incident is generated based the presentation layer, the attack path comprising a first entity connected to a second entity based on the attack path; and
wherein a single query layer edge is generated between a source node entity and a destination node entity based on a pattern definition associated with the query layer.

15. The media of claim 11, wherein executing the security query further comprises determining one or more layers of the multi-layer security that supports generating a type of query result requested in the security query, wherein the security query explicitly or implicitly identifies the one or more layers for executing the security query.

16. A computer-implemented method, the method comprising:
accessing a security graph associated with a plurality of security resources;
generating a multi-layer graph as a proxy representation of the security graph, the multi-layer graph comprising a configuration layer, a presentation layer, and a query layer, wherein the multi-layer graph is programmatically constructed as a query-optimized proxy representation of the security graph, the multi-layer graph associated with different types of security queries corresponding to at least one of: the configuration layer associated with configuration data, the presentation layer associated with attack path analysis, and the query layer associated with abstracted query responses; and
deploying the multi-layer graph to support generating query results for security queries.

17. The method of claim 16, wherein the multi-layer graph comprises a plurality of layers comprising selectively integrated security graph data associated with the security graph, wherein each layer is associated with a set of layer generation operations for identifying, from the security graph data, multi-layer graph data that corresponds to each layer.

18. The method of claim 16, wherein the configuration layer stores cloud configuration data associated with one or more entities in the cloud computing environment, wherein an entity is mapped to a configured object that is impacted by configuration data corresponding to the entity;
wherein the presentation layer is an attack graph presentation layer comprising a directed graph comprising a first entity connected to a second entity based on an attack path; and
wherein the query layer is a response generator layer comprising path between a source node entity and a destination node entity based on a pattern that abstracts out one or more entities.

19. The method of claim 16, wherein a change associated with a remediation plan of a security incident corresponds to configuration data of an entity in the configuration layer, wherein the entity is mapped to one or more configured objects that are impacted by the configuration data;
wherein a potential attack graph is generated based on presentation layer; wherein an attack path associated with a security incident is generated based the presentation layer, the attack path comprising a first entity connected to a second entity based on the attack path; and wherein a single query layer edge is generated between a source node entity and a destination node entity based on a pattern definition associated with the query layer.

20. The method of claim 16, the method further comprising:
accessing a security query associated with the multi-layer security graph;
executing the security query based on the multi-layer security graph, wherein executing the security query comprises generating a query result for the security query; and
communicating the query result.

* * * * *